Patented Feb. 11, 1941

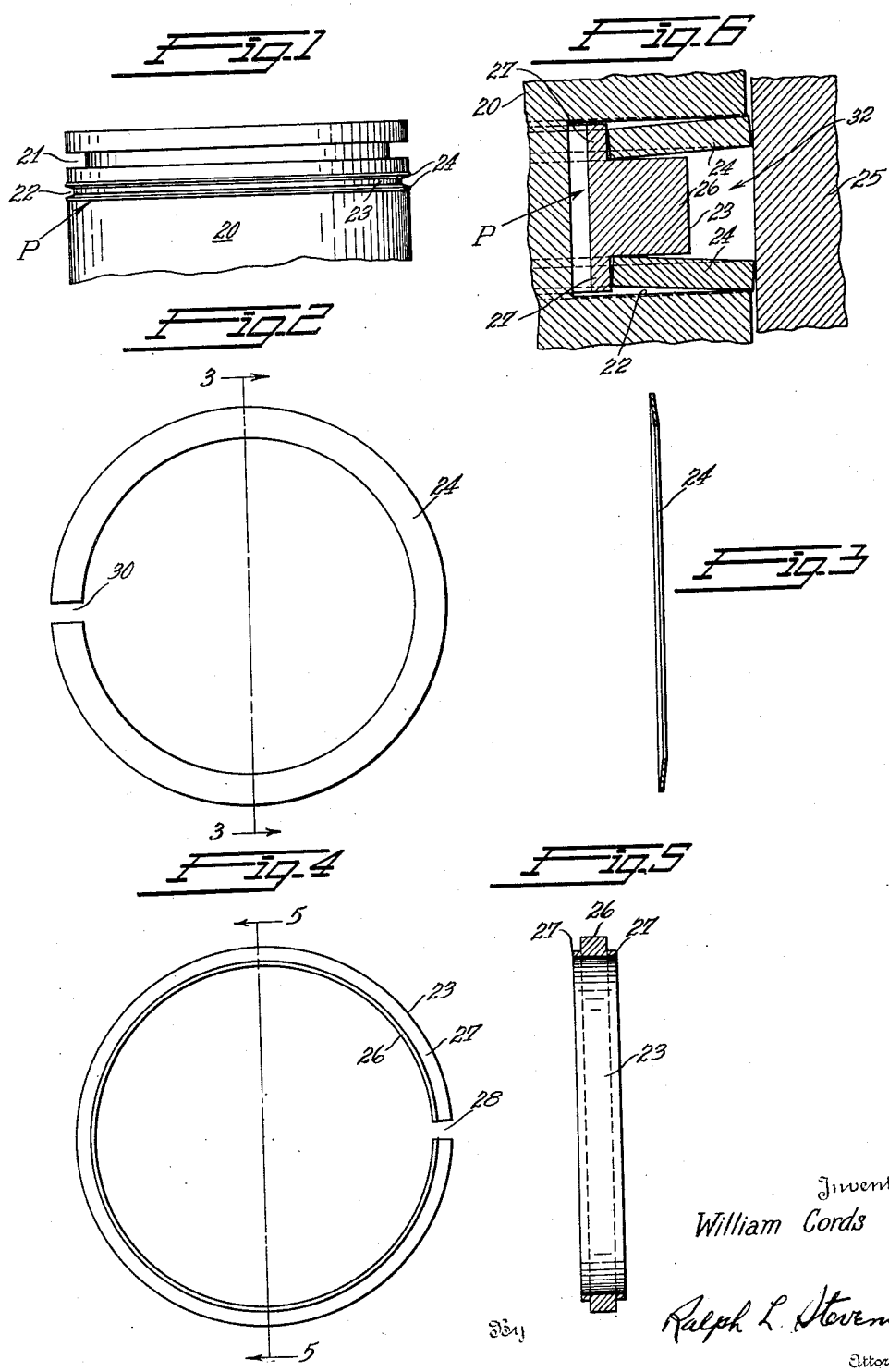

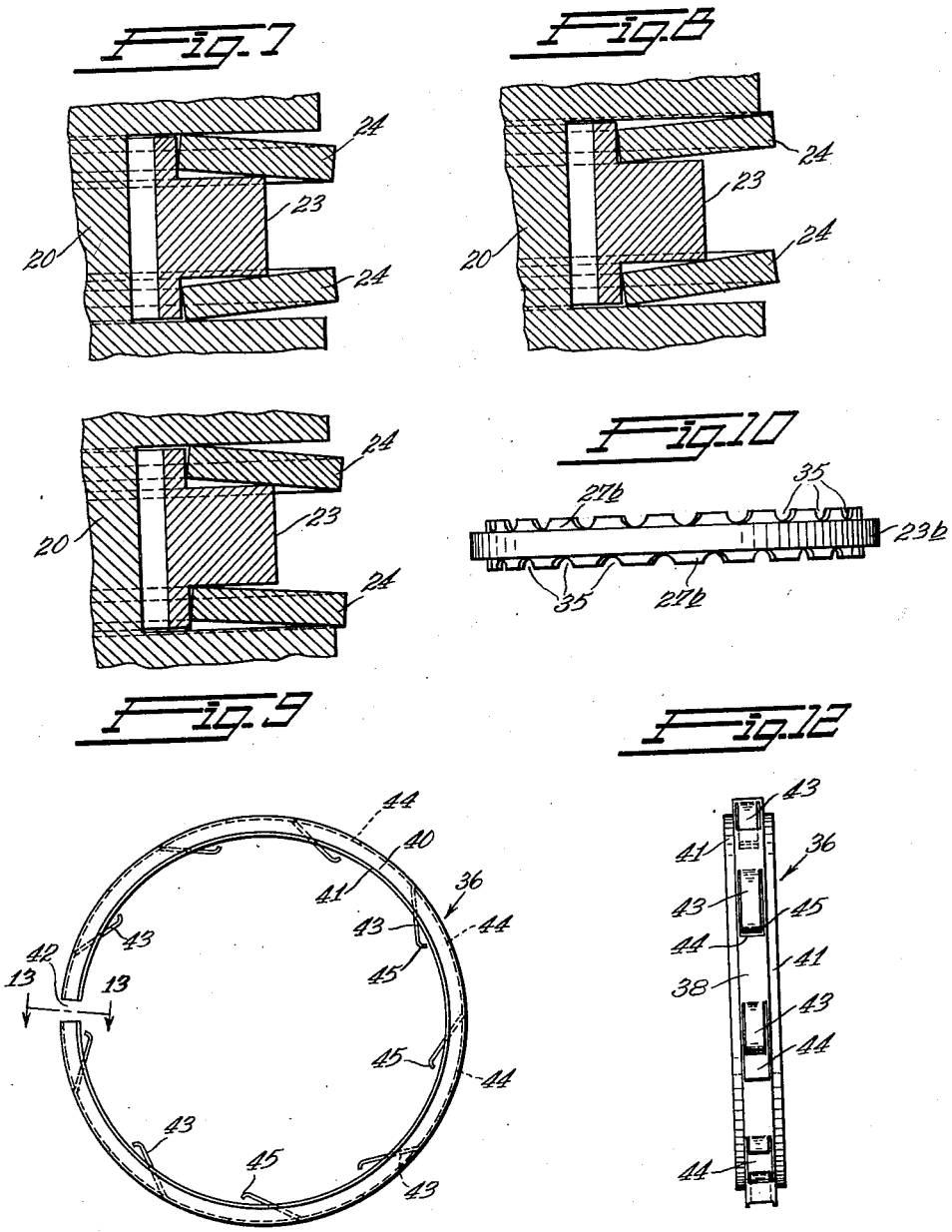

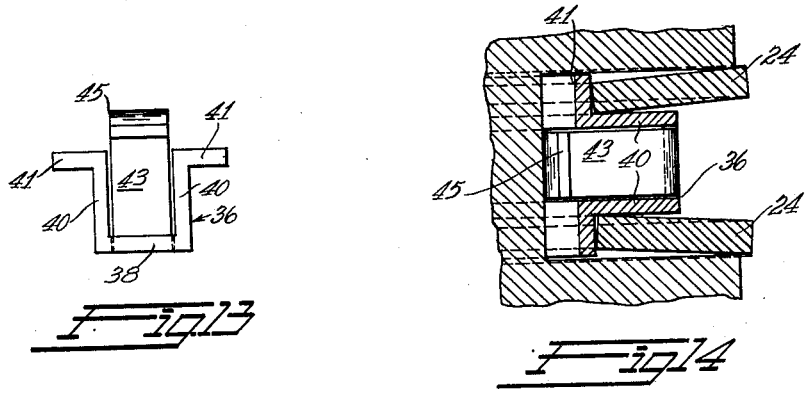
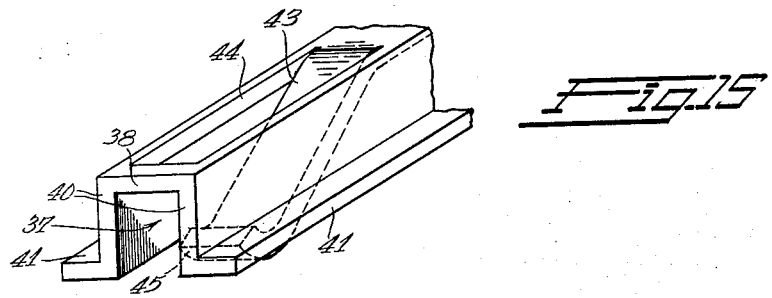
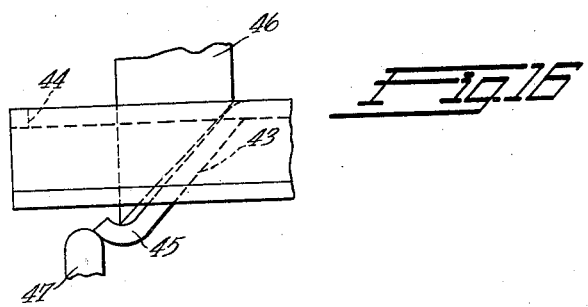

2,231,801

UNITED STATES PATENT OFFICE 2,231,801

PACKING RING ELEMENT AND ASSEMBLY

William Cords, San Diego, Calif.

Application February 21, 1938, Serial No. 191,791

4 Claims. (Cl. 309—45)

The present invention relates to packing rings designed to afford an annular seal between a pair of cylindrical surfaces which undergo relative reciprocation such, for example, as the surfaces of the plunger and cylinder of a motor or pump of reciprocating type. The invention relates especially to packing rings useful particularly as sealing rings for the pistons of internal combustion engines.

In United States Letters Patent No. 2,091,947, issued to me on August 31, 1937, there is disclosed a novel type of packing ring assembly comprising a plurality of dish-shaped segments each consisting of one or more convolutions of material, with the several convolutions designed to substantially fill a piston groove and to serve as self-expanding and sealing portions of the assembly. This patented ring has found a wide market throughout the world, especially for use in automobile, locomotive and aircraft engines, and in compressors of the reciprocating type. Such rings have been successful mainly because of their high resilience, light sealing pressures with slow wear and capacity to expand automatically to compensate for wear. Their success has been uniform except for infrequent improper installation by incompetent mechanics and abusive use under abnormal conditions of operation. When they are properly installed for repair purposes in a conventionally grooved piston, it very frequently happens that the groove will hold more segments than are actually necessary to afford an effective seal. In fact, there are many recorded instances where these patented assembled segments, when used in an automobile engine, have afforded a seal so much more efficient than that contemplated or conceived possible by the designers of the engine as to cause, in the absence of special precautionary steps, trouble in other parts of the engine.

It is a primary object of the present invention to provide a packing ring assembly embodying a minimum number of segments of the aforementioned type, for application to a groove which would require a greater number of segments if applied in the manner specifically illustrated in said patent. My invention, however, is not confined to use of the patented form of segment and it contemplates further novel features and principles which are set forth in the following objects.

It is a further major object of this invention to devise a sealing assembly, in which a pair of dished annular segments serve to seal relatively reciprocating surfaces and simultaneously to float a backing or positioning member between the side walls of the groove in which they are mounted.

Another important object of my invention resides in the provision of a packing assembly comprising a pair of annular sealing segments backed up by an expanding ring which separates the segments and which itself is spaced from the surface to be sealed to thus form, with said segments and said surface, an annular channel. In this connection, it is desirable that the segments be of dished form and assembled under partial lateral compression.

It is another major object of the present invention to devise a packing ring comprising a pair of thin annular segments, preferably dished, and an annular rolled-steel expander which engages one edge of each segment to press its other edge into sealing contact with a cylindrical surface. Preferably, the expander is of simple design, consisting of a hard, resilient, and contractible ring having an inherent tendency to expand to normal position from a position of contraction. The segments may have little or no inherent tendency to expand radially.

More specifically, it is an object of my invention to provide a multi-part ring assembly comprising a pair of dished segments in cooperation with an annular separating and expanding member of such form that, regardless of the direction in which the concave sides of the segments face when assembled they will be engaged laterally as well as radially by said member.

Further important objects of this invention are to devise new and improved expanders of the annular type, and methods for making the same. The invention is especially concerned with the production of an expander comprising a pair of lateral flanges separated by a relatively deep body, for cooperation with dished sealing segments.

The foregoing and other additional objects of the present invention will clearly appear from a study of the following detailed description when taken in conjunction with the accompanying drawings and the appended claims. In said drawings—

Figure 1 is a fragmentary view, in elevation, showing the top of a piston which has one of its grooves equipped with an oil control ring constituting one form of the packing of the present invention.

Figure 2 is a plan view of one of the ring segments of the packing seen in Fig. 1.

Figure 3 represents a sectional view taken on the plane of line 3—3, Fig. 2.

Figure 4 is a plan view of the expander utilized in the packing seen in Fig. 1.

Figure 5 represents a sectional view taken on the plane of line 5—5, Fig. 4.

Figure 6 is an enlarged fragmentary section taken through the packed groove of Fig. 1 and including a portion of a cylinder in association with the piston.

Figure 7 is a view similar to Fig. 6, with the cylinder omitted and with the segment arrangement modified slightly.

Figures 8 and 9 differ from Fig. 7 only in a rearrangement of one of the segments in each instance with respect to Fig. 7.

Figure 10 is a view looking toward the periphery of a modified form of annular expander.

Figure 11 is a plan view of a still further modification of the expander ring.

Figure 12 is a view looking toward the periphery of the expander of Fig. 11.

Figure 13 is an end view of the same expander, as seen when looking toward the plane of line 13—13, Fig. 11, in the direction of the arrows.

Figure 14 is a view similar to those of Figs. 7 to 9, but disclosing the expander of Figs. 11 and 12 in combination with the segments.

Figure 15 is a view in perspective of one end of a strip of stock from which the expander of Figs. 11 to 14 can be made.

Figure 16 is a diagrammatic showing of a step in the manufacture of the expander of Figs. 11 to 14.

With continued reference to the drawings, wherein like characters are employed to designate like parts, and with particular reference first to Figs. 1 to 6, the piston 20 is of conventional form with a top groove 21 designed to receive the usual firing ring (not shown), and one or more similar grooves 22 designed to receive conventional sealing and compression rings but having by oil control packing P substituted therefor.

The packing P consists of an annular expander 23 which has an internal diameter materially greater than the diameter of the bottom of the groove so as to form with the latter a clearance space even when the expander is contracted in use; and a pair of thin annular segments 24 which are pressed outwardly by the expander into sealing contact with the internal wall of a cylinder 25. The elements of the packing are shown in freely expanded position in Fig. 1, and in their slightly contracted working position in Fig. 6.

The expander 23 comprises a body portion 26 having lateral flanges 27 at its inner edge which serves as shoulders constantly engaging the inner edges of the segments 24. It has in its free disassembled position a gap 28 (Fig. 4) which becomes very small when the expander is contracted by insertion of the piston in the cylinder. Likewise the segments 24 have gaps 30 (Fig. 2) which become very narrow upon contraction. The extremities of the flanges 27 clear the groove side walls by, say, 0.002 inch each. The plane flat sides of the body 26 have much greater clearances with respect to the groove side walls to permit reception of the inner edges of the segments 24 and to permit said segments to expand and contract freely.

The segments 24 are of dished or frustroconical shape, as shown; and although they may be made of any suitable material by stamping, rolling or any other known method, they preferably are made in the manner taught in my aforementioned patent, No. 2,091,947. This preferred method consists in bending, edgewise, a flat strip of tempered high carbon steel wire (for example, 0.8% carbon) into a multi-convolution coil and thereafter cutting the coil into segments of one or more convolutions each. This bending operation is carried out under proper control, as taught in another of my patents, No. 1,919,584, granted July 25, 1933, to produce a dish formation that is uniform and of predetermined degree. In the present invention the degree of dish preferably is such that when the segments are assembled as shown in Fig. 6, they will remain in dished form but be partially compressed laterally between the groove side walls and the plane sides of the expander body 26.

The expander preferably is produced likewise from a strip of high carbon steel stock and by bending or rolling operation. Due to its width, however, the stock assumes but little, if any, change in its cross-sectional shape during the rolling step; but there are changes produced in its molecular structure which give it the high and permanent resilience desired for an annular expander. This method of production has the further advantage that, for any number of piston grooves which vary in depth but are of substantially the same width, a single size of stock may be used to produce expanders which will properly fit the various grooves. That is, since there is a large clearance between the outer edge of the expander and the cylinder wall to produce an annular channel 32 (Fig. 6), and since the rolling diameter of the bending machine is variable, expanding rings of various diameters may be produced from a single stock.

The desired partial lateral compression of the dished segments 24 may be obtained either initially by forcing them into position in the groove in association with an expander body which makes lateral compression a prerequisite to their admittance, or by simply inserting them with a close or fairly snug fit and thereafter relying upon contraction produced by the cylinder wall to tend to increase the degree of dish and thus cause a slight lateral compression. Preferably the initial insertion causes them to be squeezed laterally, as can be seen from the following example.

Let it be assumed that in Figs. 1 and 6 the piston is of approximately 3" diameter; that the groove width is approximately ⅛", with a clearance of about 0.002" between its side walls and the expander flanges 27; and that the thickness of the segment material is 0.027". Under these conditions each segment 24 preferably will have sufficient dish to give it a total overall width, prior to insertion, of about 0.037"; and the segment-engaging side of each flange preferably will have a width of about 0.032" which, combined with the clearance above mentioned, affords a space 0.034" in width to accommodate a segment 0.037" in width. Each segment therefore must be partially compressed laterally to decrease its degree of dish as it is inserted, the amount of decrease corresponding to an overall thickness reduction of 0.003". This tends to increase the ring diameter and cause it to extend materially beyond the piston, but when the assembly is inserted in the cylinder a slight contraction is produced which materially increases the lateral pressure which each segment exerts against the groove side wall and the expander.

The width or radial depth of each segment is such that when assembled as in Fig. 6 it has caused the expander 23 to contract somewhat.

This contraction need but be very slight where the segments are made by the preferred method outlined above, as such segments have an inherent tendency to maintain full sealing contact with the cylinder wall throughout their life, but it is essential when the segments are formed by stamping or of a relatively soft material which lacks sufficient temper and resilience. Generally speaking, the expander is designed to contract when assembled to a degree depending upon the size and proposed use of the packing.

From the foregoing it will be seen that the segments (Fig. 6) make circular sealing contacts with the cylinder wall at their outer edges, with the groove side walls adjacent their outer edges, with the expander body 26 adjacent their inner edges and with the flanges 27 at their inner edges. They thus seal against leakage by way of the cylinder wall and by way of the groove, and they form the hydraulic or oil channel 32 which serves both as a trap to increase efficiency and as a reservoir to assure adequate lubrication. The lateral compression of the segments also serves to steady the entire assembly in operation, and there is mutual cooperation between the segments and the expander to cause each to maintain a proper position while allowing the entire packing to have resilience both laterally and radially. The dished formation of the segments causes them to operate smoothly and without chatter, with a squeegee effect which causes them to wipe away excess oil and simultaneously to leave or spread a very thin lubricating film upon the cylinder wall.

Any desirable heat treatment may be given to the expander and the segments as steps in the method of manufacture, depending upon the selected materials of which they are made.

The design of the expander 23 lends it to successful use in combination with several altered arrangements of the segments 24, as seen in Figs. 7, 8 and 9. In Fig. 7, the segments are turned upside down with respect to their position of Fig. 6 so that they converge outwardly, with the result that the lateral sealing circles are located respectively on the groove side walls adjacent the expander flanges and on the outermost edges of the expander body.

In Fig. 8, the position of the upper segment corresponds with that of Fig. 6, while the lower segment is inserted upside down as in Fig. 7. The arrangement of Fig. 9 simply constitutes a reversal of that of Fig. 8, both segments being inclined downwardly in a radially outward direction.

In Fig. 10 there is illustrated a modified form of expander 23b, which differs from expander 23 only in the provision of a multiplicity of identical and uniformly spaced notches 35 in its edges to produce scalloped flanges 27b. Preferably, the notches in one flange are staggered relative to those of the other, as shown. The notching is done prior to, and to facilitate, the bending of the stock into annular or coiled formation. For the same purpose, a series of spaced holes may be made in the body portion of the expander in a direction perpendicular to the plane of the flanges.

A further and more important modification of the expander and its method of manufacture is illustrated in Figs. 11 to 16, wherein an expander 36 of the same general shape and action is produced from thin sheet metal. A flat strip of sheet metal of the requisite width for the purpose at hand, and a thickness of about 0.015", is rolled and pressed to the shape shown for the end of the strip in Fig. 13. This shape differs from that of the expander 23 only in the provision of a channel 37 in the body portion. The body portion in this form comprises an outer wall 38 joining a pair of side walls 40, and the flanges 41 are offset laterally from these side walls.

The material preferably consists of untempered steel of medium carbon content and must be capable of taking and hardening under a subsequent heat treatment. The shape above described may be imparted to an elongated straight strip which is thereafter to be cut into shorter strips and bent to annular form, or it may be imparted during the bending operation. A small gap 42 is present between the ends of the annulus. Expanding rings when made of certain special materials may be used with some measure of success, after hardening, without augmenting their inherent resilience. I prefer, however, before the hardening treatment to incorporate a special feature for augmenting the resistance of the annulus to contraction, and this is done by further shaping of the stock, as follows:

At uniformly spaced intervals along the outer wall 38, tongues 43 are punched from the metal of said wall and bent into the channel 37 to leave a series of three-sided slots 44 in the wall 38, the widths of which preferably closely approximate the distance between the side walls 40. These tongues are bent inwardly until their free ends project past the plane of the flanges 41, and said free ends preferably are curved as at 45 to ride against the bottom of the piston groove when the assembly is completed as in Fig. 14.

Fig. 16 illustrates a method of punching the tongues out with a tool 46 and bending the tongue ends with an abutment pin 47. This step may be performed simultaneously with or prior to that of bending the stock into annular form. Preferably, however, the flat stock first is pressed into a channeled straight strip, then is cut and rolled into annular form, and then is operated on with the punch mechanism to produce the tongues. The tool 46, with reference to Fig. 16, first moves downwardly to cut the narrow end of the slot 44 with its sharp lower edge, then cuts the sides of the slot while the tool and strip undergo relative horizontal movement and then continues downwardly to force the end of the tongue into abutment with the pin 47 to produce the curved tip 45.

When the completed annular expander 36 has been hardened and assembled in a groove it cooperates with the segments 24 in precisely the same manner as does the expander 23. The only difference is that the resilient tongue 43 are partially compressed against the bottom of the groove and hence act as levers urging the segments outwardly and as backing elements for preventing collapse of the expander body.

It will be appreciated that various modifications in the illustrated details and arrangements may be made within the scope of my invention. The expander 36 may be used in any of the combinations in which expander 23 is shown. Therefore I wish it understood that my invention is not confined to specific illustrations but is to be limited in the usual manner only by liberal interpretation of the appended claims in the light of my disclosure and the prior art.

What is claimed is:

1. In combination with means forming an annular groove to be packed, a packing ring assembly comprising at least one annular sealing segment of dished material adjacent each side of the groove; and a split annular device, having a portion separating the sealing segments and integral portions radially engaging said segments to resist any tendency causing the latter to approach the groove bottom in diameter; said device being substantially less in width than the groove, and its said separating portion and said segments having a combined width slightly greater than the groove width, the difference in width being such that said segments are under partial lateral compression to float said device resiliently in position within the groove.

2. In combination with means forming an annular groove to be packed, a packing ring assembly comprising a split annulus which clears the groove bottom when fully contracted and which has substantial clearance with respect to the groove side walls, said annulus being contained entirely within the groove when fully expanded, and thin sealing rings if dished form fitted under partial lateral compression between said annulus and said side walls to make lateral sealing contact with the latter and the sides of the annulus.

3. In combination with means forming an annular groove to be packed, a packing ring assembly comprising at least one annular sealing segment of dished material adjacent each side of the groove; and a split annular device, having a portion separating the sealing segments and integral portions radially engaging said segments to resist any tendency causing the latter to approach the groove bottom in diameter; said device being less in width than the groove, and its said separating portion and said segments having a combined width slightly greater than the groove width, the difference in width being such that said segments are under partial lateral compression to float said device resiliently in position within the groove; and said separating portion having considerably less depth than the groove and thereby forming, together with segments and any cylindrical surface to be sealed, an annular closed channel.

4. In combination with means providing an annular groove having side walls and a bottom, an expander within the groove comprising an annular body terminating short of the mouth of the groove and having an offset flange affording an annular shoulder facing radially outwardly, said flange being near the bottom of the groove and extending toward one of said side walls; and a thin, substantially frustroconical, annular sealing segment engaged at its inner edge by said flange and fitted snugly between said one wall and said expander body, said segment having an axial thickness very appreciably less than the axial width of said shoulder so that the segment clearly retains its frustroconical shape when combined with the expander within said groove.

WILLIAM CORDS.